US010422284B2

(12) United States Patent
Slayter et al.

(10) Patent No.: US 10,422,284 B2
(45) Date of Patent: Sep. 24, 2019

(54) PINNED MECHANICAL FUSE FOR ENGINE MOTORING SYSTEM

(71) Applicant: Hamilton Sundstrand Corporation, Charlotte, NC (US)

(72) Inventors: Matthew Allen Slayter, Rockford, IL (US); Richard Alan Davis, Stillman Valley, IL (US); Paul F. Fox, Loves Park, IL (US); Jeffrey Todd Roberts, Winnebago, IL (US); Jeff A. Brown, Cherry Valley, IL (US); James Vandung Nguyen, Rockford, IL (US); Benjamin T. Harder, DeKalb, IL (US); Dwayne Leon Wilson, Rockford, IL (US); Brian McMasters, Caledonia, IL (US); Daniel Richard Walker, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 502 days.

(21) Appl. No.: 15/202,155

(22) Filed: Jul. 5, 2016

(65) Prior Publication Data
US 2018/0010521 A1    Jan. 11, 2018

(51) Int. Cl.
*F02C 7/268*    (2006.01)
*F01D 15/12*    (2006.01)
(Continued)

(52) U.S. Cl.
CPC .............. *F02C 7/268* (2013.01); *F01D 15/12* (2013.01); *F01D 25/36* (2013.01); *F02C 7/32* (2013.01);
(Continued)

(58) Field of Classification Search
CPC ............................ F16D 9/06; F05D 2260/311
See application file for complete search history.

(56) References Cited

U.S. PATENT DOCUMENTS 1,414,207 A * 4/1922 Reed ....................... E21B 17/06
                                                      285/12
3,272,476 A   9/1966 Durdin
(Continued)

OTHER PUBLICATIONS

European Search Report for Application No. 17179832.5-1607; Report dated Nov. 24, 2017; 1-7 pages.

*Primary Examiner* — Terence Boes
(74) *Attorney, Agent, or Firm* — Cantor Colburn LLP

(57) ABSTRACT

A motoring system for a gas turbine engine having: a reduction gear train having an input and output; a motor operably connected to the input; a clutch operably connected to the output, the clutch in operation engages and disengages the reduction gear train; and a pinned mechanical fuse operably connecting the output to the clutch, the pinned mechanical fuse having at least one shear pin. The pinned mechanical fuse having: an outer sleeve having a first section, second section, inner chamber, outer wall, and at least one through hole connecting the inner chamber to the outer wall within the first section; and an inner sleeve having a first portion, second portion, outer surface, and at least one blind hole located in the outer surface within the second portion. The second portion being located within the inner chamber and operably connected to the outer sleeve through at least one shear pin.

8 Claims, 2 Drawing Sheets

(51) Int. Cl.
　　　*F01D 25/36*　　　(2006.01)
　　　*F02C 7/32*　　　(2006.01)

(52) U.S. Cl.
　　　CPC ...... *F05D 2220/32* (2013.01); *F05D 2230/60* (2013.01); *F05D 2260/311* (2013.01); *F05D 2260/85* (2013.01)

(56) References Cited

U.S. PATENT DOCUMENTS

| | | |
|---|---|---|
| 4,733,529 A | 3/1988 | Nelson et al. |
| 6,059,085 A | 5/2000 | Farnsworth |
| 2005/0121916 A1 | 6/2005 | Olsen et al. |

\* cited by examiner

PINNED MECHANICAL FUSE FOR ENGINE MOTORING SYSTEM

BACKGROUND

The subject matter disclosed herein generally relates to engine motoring systems, and more specifically to an apparatus and a method for protecting an aircraft engine starter motor from overspeed.

Gas turbine engines used on modern aircraft are composed of a compressor, a combustion chamber, a turbine, and a main shaft connecting the turbine to the compressor. External air is compressed by the compressor and sent to the combustion chamber where an air-gas mixture combusts and provides thrust to the aircraft as it exits the engine. The combusted air-gas mixture also rotates the turbine as it exits the engine and the turbine rotates the compressor through the main shaft. At various times, the main shaft may need to be slowly rotated or motored to maintain thermal equilibrium throughout the engine.

SUMMARY

According to one embodiment, a motoring system for a gas turbine engine is provided. The motoring system having: a reduction gear train having an input and an output; a motor operably connected to the input; a clutch operably connected to the output, the clutch in operation engages and disengages the reduction gear train; and a pinned mechanical fuse operably connecting the output to the clutch, the pinned mechanical fuse having at least one shear pin. The pinned mechanical fuse having: an outer sleeve having a first section, a second section, an inner chamber, an outer wall, and at least one through hole connecting the inner chamber to the outer wall within the first section; and an inner sleeve having a first portion, a second portion, an outer surface, and at least one blind hole located in the outer surface within the second portion. The second portion being located within the inner chamber and operably connected to the outer sleeve through the at least one shear pin. The at least one through hole is aligned with the at least one blind hole. The at least one shear pin is secured within the at least one through hole and the at least one blind hole. The at least one shear pin in operation shears when torque on the pinned mechanical fuse is greater than or equal to a selected value.

In addition to one or more of the features described above, or as an alternative, further embodiments of the motoring system may include that the at least one shear pin is secured by a securing sleeve encircling the first section of the outer wall.

In addition to one or more of the features described above, or as an alternative, further embodiments of the motoring system may include that the selected value is about 64 foot-pounds (87 newton-meters).

In addition to one or more of the features described above, or as an alternative, further embodiments of the motoring system may include that the selected value is about 64 foot-pounds (87 newton-meters).

In addition to one or more of the features described above, or as an alternative, further embodiments of the motoring system may include that the pinned mechanical fuse includes two shear pins.

In addition to one or more of the features described above, or as an alternative, further embodiments of the motoring system may include that the pinned mechanical fuse includes two shear pins.

In addition to one or more of the features described above, or as an alternative, further embodiments of the motoring system may include that the second portion of the inner sleeve is elongated and has a cylindrical shape.

In addition to one or more of the features described above, or as an alternative, further embodiments of the motoring system may include that the second section of the outer sleeve is operably connected to the clutch; and the first portion of the inner sleeve is operably connected to the output.

According to another embodiment, a method of manufacturing a motoring system for a gas turbine engine is provided. The method having the steps of: assembling a pinned mechanical fuse, the pinned mechanical fuse including at least one shear pin; forming an outer housing; installing a reduction gear train into the outer housing, the reduction gear train having an input and an output; operably connecting a motor to the input; and operably connecting a clutch to the output using the pinned mechanical fuse, the clutch in operation engages and disengages the reduction gear train. The at least one shear pin in operation shears when torque on the pinned mechanical fuse is greater than or equal to a selected value.

In addition to one or more of the features described above, or as an alternative, further embodiments of the method may include that assembling further includes: forming the at least one shear pin; forming an outer sleeve having a first section, a second section, an inner chamber, an outer wall, and at least one through hole connecting the inner chamber to the outer wall within the first section; forming an inner sleeve having a first portion, a second portion, an outer surface, and at least one blind hole located in the outer surface within the second portion; inserting the second portion of the inner sleeve into the inner chamber of the outer sleeve; aligning the at least one through hole with the at least one blind hole; inserting the at least one shear pin into the aligned at least one through hole and at least one blind hole; and securing the at least one shear pin in the aligned at least one through hole and at least one blind hole.

In addition to one or more of the features described above, or as an alternative, further embodiments of the method may include that the at least one shear pin is secured by a securing sleeve encircling the first section of the outer wall.

In addition to one or more of the features described above, or as an alternative, further embodiments of the method may include that the selected value is about 64 foot-pounds (87 newton-meters).

In addition to one or more of the features described above, or as an alternative, further embodiments of the method may include that the selected value is about 64 foot-pounds (87 newton-meters).

In addition to one or more of the features described above, or as an alternative, further embodiments of the method may include that the pinned mechanical fuse includes two shear pins.

In addition to one or more of the features described above, or as an alternative, further embodiments of the method may include that the pinned mechanical fuse includes two shear pins.

In addition to one or more of the features described above, or as an alternative, further embodiments of the method may include that the second portion of the inner sleeve is elongated and has a cylindrical shape.

In addition to one or more of the features described above, or as an alternative, further embodiments of the method may include that the second section of the outer sleeve is operably connected to the clutch; and the first portion of the inner sleeve is operably connected to the output.

Technical effects of embodiments of the present disclosure include a pinned mechanical fuse in a drive line connecting a motor to a gas turbine engine. The pinned mechanical fuse being capable to withstand a torque required for normal operation of a motoring system and is also configured to shear when the torque is greater than or equal to a selected value.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
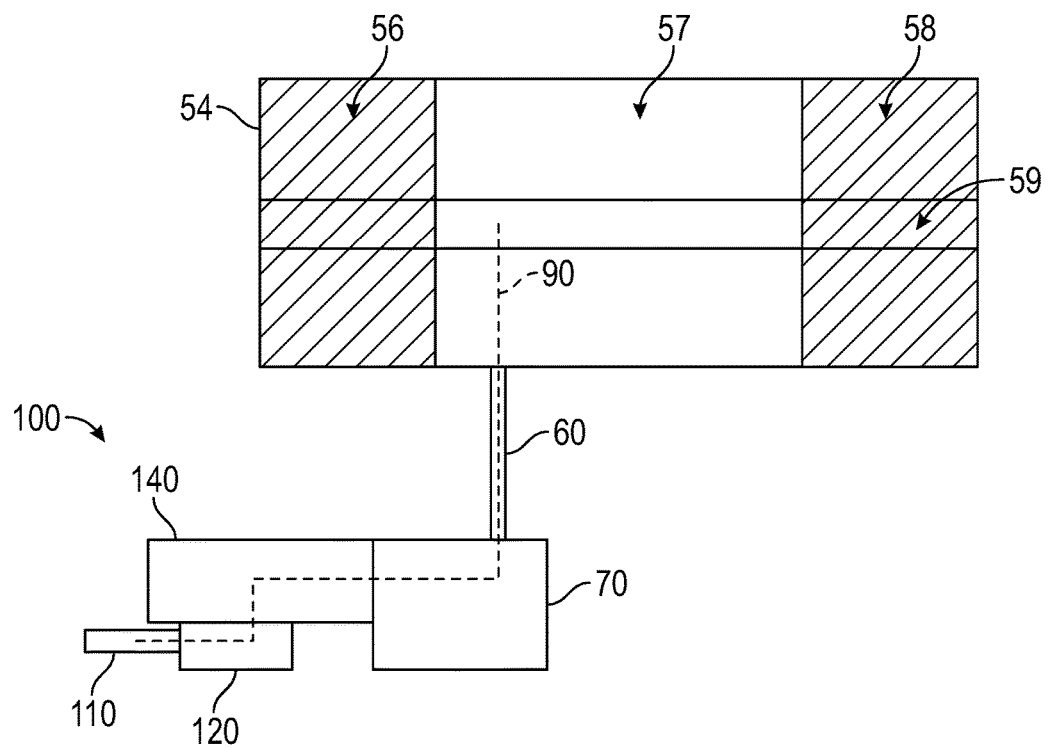
FIG. 1 is a block diagram of an engine and associated motoring system, according to an embodiment of the present disclosure.
Figure 2:
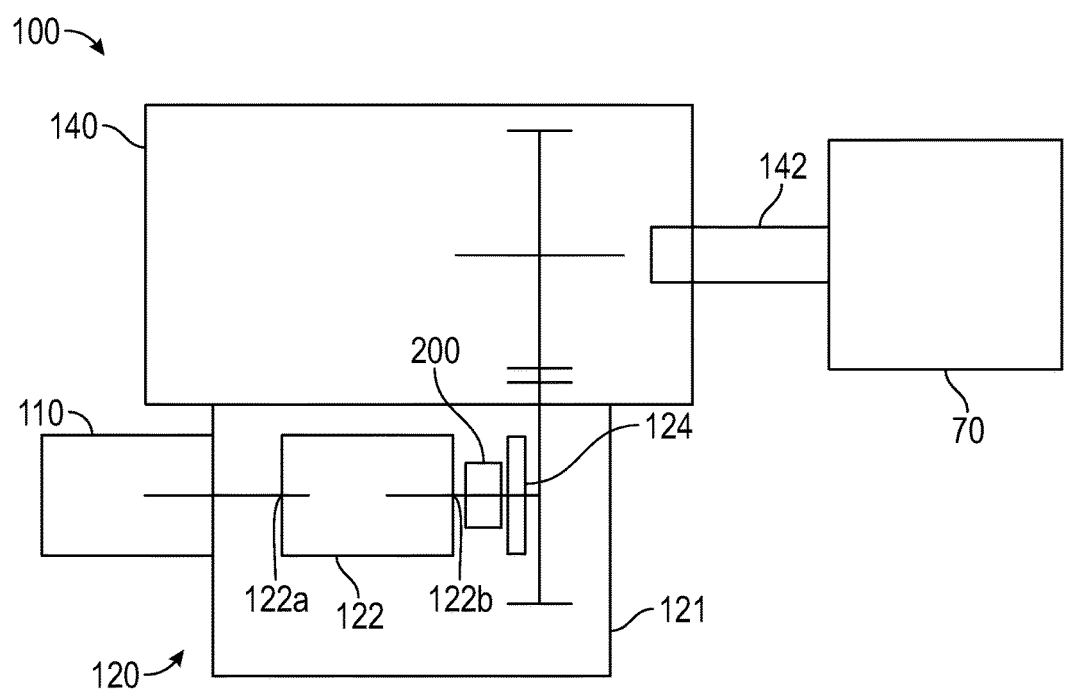
FIG. 2 is a block diagram of the motoring system of FIG. 1, according to an embodiment of the present disclosure.
Figure 3:
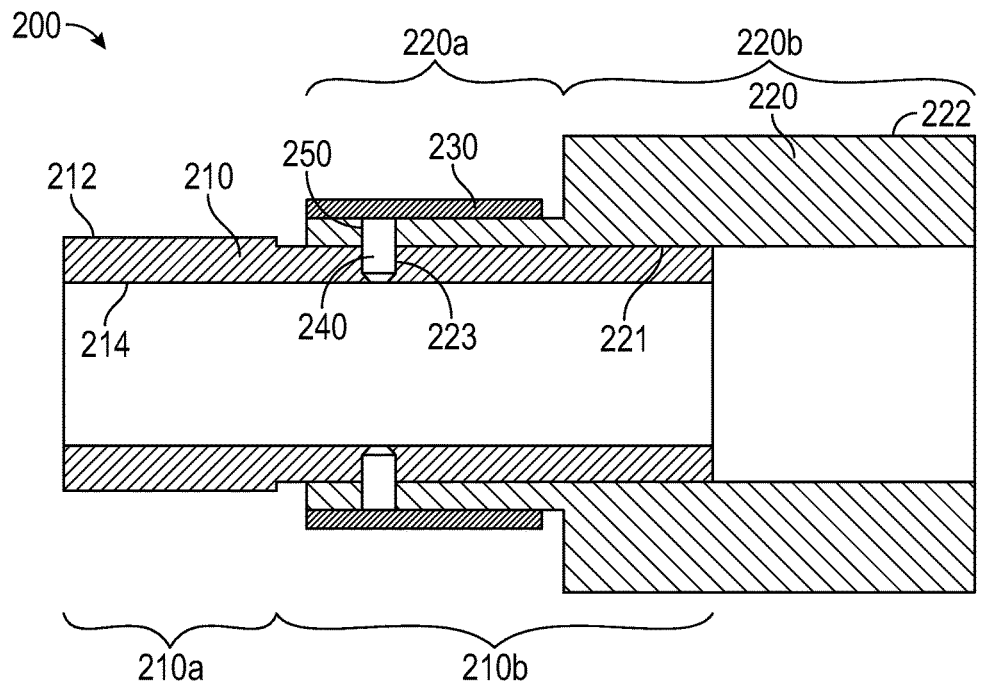
FIG. 3 is a cross-sectional view of a pinned mechanical fuse of the motoring system of FIG. 2, according to an embodiment of the present disclosure.

Referring now to FIGS. 1-3, various embodiments of the present disclosure are illustrated. FIG. 1 shows a block diagram of an engine 54 and associated motoring system 100, according to an embodiment of the present disclosure. The engine 54 may be a gas turbine engine that may be used on an aircraft. FIG. 2 shows a block diagram of the motoring system 100 of FIG. 1, according to an embodiment of the present disclosure. FIG. 3 shows a cross-sectional view of a pinned mechanical fuse 200 of the motoring system 100 of FIG. 2, according to an embodiment of the present disclosure.

At a high level, the motoring system 100 includes a motor 110, a reduction gearbox 120, and a starter 140. The motoring system 100 is operably connected to the engine 54 through an accessory gear box 70 and drive shaft 60, as shown in FIG. 1. The reduction gearbox includes an outer housing 121 and a reduction gear train 122 within the outer housing 121. The reduction gear train 122 includes an input 122a and an output 122b. The motor 110 is operably connected to the reduction gear train 122 at the input 122a. In an embodiment, the motor 110 may be an electric motor. A clutch 124 is operably connected to the reduction gear train 122 at the output 122b. The clutch 124 may be operably connected to accessory gearbox 70 through the starter 140 and the output shaft 142. In operation the clutch 124 may engage and disengage the reduction gear train 122.

The motor 110 is configured to execute a motoring process of the engine 54 by getting the main shaft 59 of the engine 54 rotating. The main shaft 59 operably connects the compressor 56 to the turbine 58. Thus, once the compressor 56 starts spinning, air is pulled into the combustion chamber 57 and mixed with gas for combustion. Once the air and gas mixture combust in the combustion chamber 59, the controlled explosion is then accelerated past the turbine 58, which rotates the turbine 58 and subsequently the compressor 56. The motor 110 is connected to the engine 54 by a drive line 90, which runs from the motor 110, to the reduction gear train 122, to the clutch 124, to the starter 140, to the starter output shaft 142, to the accessory gearbox 70, to the drive shaft 60, and finally to the main shaft 59 of the engine 54. The motor 110 operates at a high angular velocity to initiate the motoring process and gets the main shaft 59 of the engine 54 turning at a low angular velocity. During the motoring process the clutch 124 is engaged so that rotational toque is transferred from the motor 110 to the main shaft 59 through the drive line 90. Once the motoring process has been completed, the motor 110 will need to be disengaged from the engine 54 because the motor 110 may overspeed when the engine 54 is begins to operate at its normal high speed. Thus, the clutch 124 disengages the reduction gear train 122 once the motoring process has been completed. The clutch 124 also disengages the reduction gear train 122 during an engine start up process.

If the clutch 124 fails to disengage the reduction gear train 122, damage to the motor 110 may result due to overspeed. A pinned mechanical fuse 200 may be incorporated into the drive line 90 to help protect the motor 110 from overspeed in the event the clutch 124 fails to disengage. The reduction gear train 122 is operably connected to the clutch 124 through the pinned mechanical fuse 200 as seen in FIG. 2. The pinned mechanical shaft fuse 200 includes at least one shear pin 240. The at least one shear pin 240 in operation shears when torque on the pinned mechanical fuse 200 is greater than or equal to a selected value. In an embodiment, the selected value may be about 64 foot-pounds (87 newton-meters).

As seen in FIG. 3, the pinned mechanical fuse 200 comprises an outer sleeve 220 and an inner sleeve 210. The outer sleeve 220 has a first section 220a, a second section 220b, an inner chamber 221, an outer wall 222, and at least one through hole 250 connecting the inner chamber 221 to the outer wall 222 within the first section 220a. The inner sleeve comprises a first portion 210a, a second portion 210b, an outer surface 212, and at least one blind hole 223 located in the outer surface 212 within the second portion 210b. The second portion 210b is located within the inner chamber 221 and operably connected to the outer sleeve 220 through the at least one shear pin 240.

Further, the second section 220b the outer sleeve 220 is operably connected to the clutch 124 and the first portion 210a of the inner sleeve 210 is operably connected to the output 122b. The inner sleeve 210 may come in a variety of shapes as long as the first portion 210a operably connects the output 122b of the reduction gear train 122 and the second section 210b fits within the inner chamber 221 of the outer sleeve 220. In an embodiment, the second portion 210b of the inner sleeve 210 is round. The inner sleeve 210 may be either solid or hollow. In the illustrated embodiment, the inner sleeve 210 is hollow and has an inner surface 214, as seen in FIG. 3. The through hole(s) 250 are aligned with the blind hole(s) 223. The at least one shear pin 240 is secured within the at least one through hole 250 and the at least one blind hole 223. The shear pin(s) 240 may be secured by a variety of methods including but not limited to gluing, welding, and/or mechanically securing. In the illustrated embodiment, the shear pin(s) 240 are secured by a securing sleeve 230 encircling the first section 220a of the outer wall 222.

Advantageously, a pinned mechanical fuse may withstand a torque required for normal operation of a motoring system but then also shear when the torque is greater than or equal to a selected value. The torque being greater than or above a selected value may indicate that a clutch failed to disengage the engine from the motor once the engine reached normal operating angular velocities.

Figure 4:
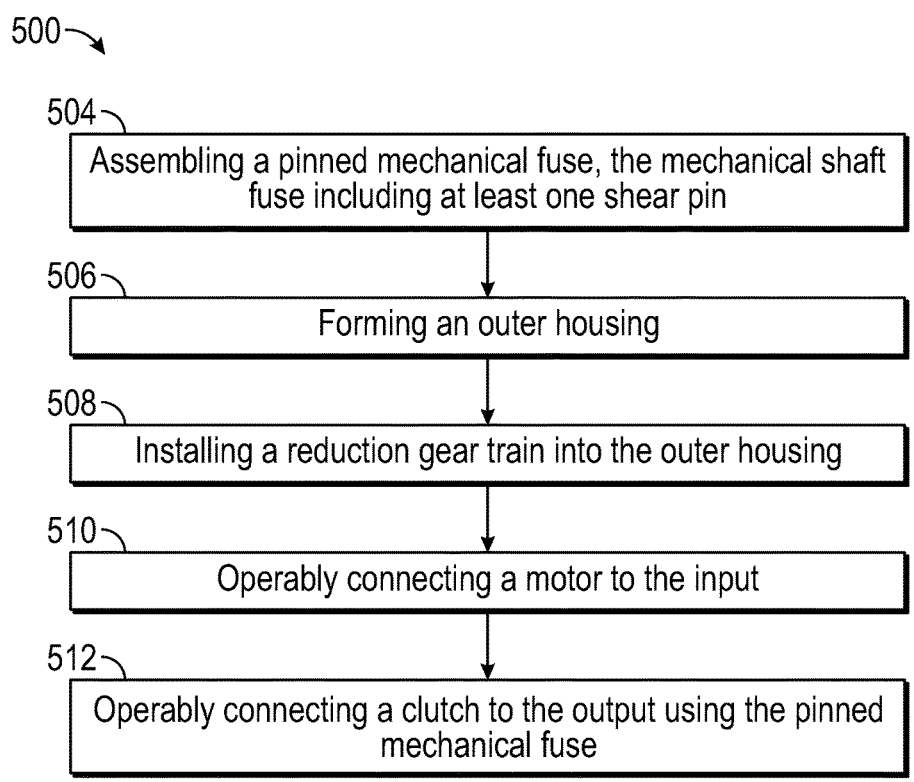
FIG. 4 is a flow process illustrating a method of manufacturing the motoring system of FIGS. 2-3, according to an embodiment of the present disclosure.

Referring now to FIG. 4, while referencing components of the motoring system 100 of FIGS. 2-3. FIG. 4 shows a flow process illustrating a method 500 of manufacturing the motoring system 100 of FIG. 2, according to an embodiment of the present disclosure. At block 504, the pinned mechanical fuse 200 is assembled. Assembling may include inserting the second portion 210b of the inner sleeve into the inner chamber 221 of the outer sleeve 220; aligning the through hole(s) 250 with the blind hole(s) 223; inserting the shear pin(s) 240 into the through hole(s) 250 and the blind hole(s) 223; and securing the shear pin(s) 240 in the through hole(s) 250 and the blind hole(s) 223. The shear pin(s) 240 may be secured by sliding the securing sleeve 230 over the first section 220a and the shear pin(s) 240. Assembling may also include forming the components of the pinned mechanical fuse 200, including but not limited to the inner sleeve 210, the outer sleeve 220, the shear pin(s) 240, and the securing sleeve 230. The method 500 may also include forming the various features of the components discussed above, such as, for example, the first portion 210a, the second portion 210b, the blind hole 223, the outer surface 212, the inner surface 214, the first section 220a, the second section 220b, the through hole 250, the outer wall 222, and the inner chamber 221. Forming may include various methods including but not limited to machining, additive manufacturing, drilling, laser etching, injection molding, and/or any other method known to one of skill in the art.

At block 506, the outer housing 121 is formed. At block 508, the reduction gear train 122 is installed into the outer housing 121. The reduction gear train 122 has the input 122a and the output 122b, as mentioned above. At block 510, the motor 110 is operably connected to the input 122a. At block 512, the clutch 124 is operably connected to the output 122b using the pinned mechanical fuse 200. As mentioned above, the at least one shear pin 240 in operations shears when torque on the pinned mechanical fuse 200 is greater than or equal to a selected value.

While the above description has described the flow process of FIG. 4 in a particular order, it should be appreciated that unless otherwise specifically required in the attached claims that the ordering of the steps may be varied.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A motoring system for a gas turbine engine comprising:
a reduction gear train having an input and an output;
a motor operably connected to the input;
a clutch operably connected to the output, the clutch in operation engages and disengages the reduction gear train;
a starter operably connected to the clutch, the starter having an output shaft;
an accessory gearbox operably connected to the output shaft of the starter, wherein the clutch is operably connected to the accessory gearbox through the starter and the output shaft of the starter; and
a pinned mechanical fuse operably connecting the output to the clutch, the pinned mechanical fuse having at least one shear pin, the pinned mechanical fuse comprising:
an outer sleeve having a first section, a second section, an inner chamber, an outer wall, and at least one through hole connecting the inner chamber to the outer wall within the first section; and
an inner sleeve having a first portion, a second portion, an outer surface, and at least one blind hole located in the outer surface within the second portion, the second portion being located within the inner chamber and operably connected to the outer sleeve through the at least one shear pin,
wherein the at least one through hole is aligned with the at least one blind hole,
wherein the at least one shear pin is secured within the at least one through hole and the at least one blind hole, and
wherein the at least one shear pin in operation shears when torque on the pinned mechanical fuse is greater than or equal to a selected value.

2. The motoring system of claim 1, wherein:
the at least one shear pin is secured by a securing sleeve encircling the first section of the outer wall.

3. The motoring system of claim 1, wherein:
the selected value is about 64 foot-pounds (87 newton-meters).

4. The motoring system of claim 2, wherein:
the selected value is about 64 foot-pounds (87 newton-meters).

5. The motoring system of claim 1, wherein:
the pinned mechanical fuse comprises two shear pins.

6. The motoring system of claim 2, wherein:
the pinned mechanical fuse comprises two shear pins.

7. The motoring system of claim 1, wherein:
the second portion of the inner sleeve is elongated and has a cylindrical shape.

8. The motoring system of claim 1, wherein:
the second section of the outer sleeve is operably connected to the clutch; and
the first portion of the inner sleeve is operably connected to the output.

* * * * *